Nov. 3, 1953 A. LATOUR 2,657,710
VALVE OPERATING APPARATUS
Filed July 23, 1947 2 Sheets-Sheet 1

INVENTOR.
ANDRE LATOUR
BY

Nov. 3, 1953 A. LATOUR 2,657,710
VALVE OPERATING APPARATUS
Filed July 23, 1947 2 Sheets-Sheet 2

INVENTOR.
ANDRE LATOUR
BY

Patented Nov. 3, 1953

2,657,710

UNITED STATES PATENT OFFICE 2,657,710

VALVE OPERATING APPARATUS

André Latour, Grenoble, France, assignor to Etablissements Merlin & Gerin, Grenoble, France Application July 23, 1947, Serial No. 763,022
In France January 9, 1945

Section 1, Public Law 690, August 8, 1946
Patent expires January 9, 1965

5 Claims. (Cl. 137—719)

The control-valves for compressed fluids presently known are not fully satisfactory as to their tightness, their sensitiveness, their reliability or their dimensions.

According to the invention, means are provided to keep the leakage at the aperture of the valve negligible, though providing at the same time a sufficiently large section for said aperture in order to assure a quick action, the geometrical axis of rotation of the valve being determinated by two adjustable center punches or knives.

Another object of the invention is to provide a valve in which a strict parallelism is secured between the seat on the cover of the valve, generally made of plastic material or the like, and the seat of the cover on the decompressing aperture, imperfections or faults due to machining being compensated eventually by the axial displacement of the center-punches.

Another object of the invention is to provide a valve in which the hinge is eliminated, thus eliminating the friction and wear common to hinges and consequently the play of the movable part of the valve.

A further object of the invention is to provide a valve, which, on closing, returns always back to the same place on its seat, its surface taking the exact shape of the decompressing aperture thus assuring a perfect tightness.

Other features of the invention appear in the following description, reference being made to the annexed drawings showing different embodiments, without limitation of the invention.

Figure 1:
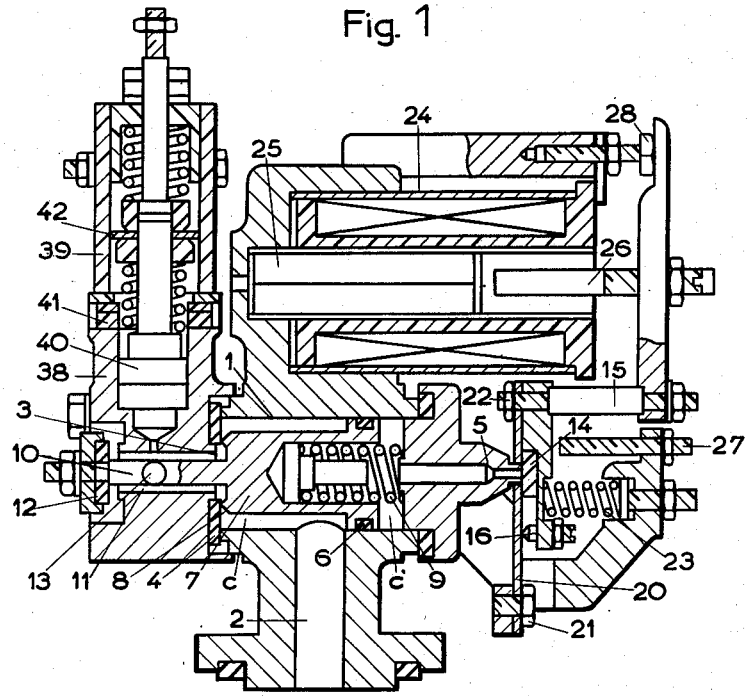
Fig. 1 is a sectional view of the entire control device.
Figure 2:
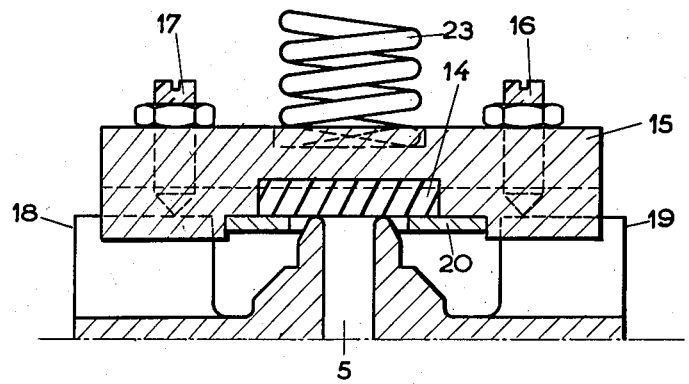
Fig. 2 is a sectional view at a larger scale of a part of this device.

In Fig. 1, 1 is the cylinder connected to the compressed-air tank by the feed pipe 2, having at its left end the aperture of valve 3 surrounded by a washer and at its right end a nozzle 5. In this cylinder moves the valve-piston formed by the head 6 with a piston ring, the cylindrical body 7 and the left end 8, acting as a valve and bound to be pressed, in its rest position, against the washer 4 by the spring 9. The piston has an extension in the form of a rod 10 sliding in the duct 11, which is adapted to be closed at its end by the outlet valve 12. The head 6 of the piston divides the cylinder in two compartments, the valve compartment C and the decompressing compartment C'. The compartment C' is filled with compressed air flowing from the compartment C by leakage between the cylinder walls and the piston head 6. From the duct 11 starts, at right angles to it, the duct 13 leading the compressed air to the device to be controlled (not shown in the drawings). The nozzle 5 connects by its aperture (decompressing aperture) the compartment C' with the outer air. It is kept closed by a slab 14 forming a decompressing valve and fixed to a lever 15. The lever 15 turns around a geometrical axis defined by the tips of the center punches 16 and 17 fixed to the lever. Fig. 2 is an axial sectional view of the nozzle 5 and shows the tips of the center punches bearing on a fixed flat surface, preferably situated at the level of the orifice of the nozzle 5; this surface may have the form of a strap. Between the branches 18 and 19 of this strap passes a leaf spring 20, fixed to this flat surface of the strap by a screw 21 and to the lever 15 by a screw 22. In the closed position, the plane of the spring coincides with the level of the mouth of the nozzle 5.

A coil spring 23 presses the decompressing valve 14 against the mouth of the nozzle 5. The spring 23 may be arranged so as to act at the interior of the triangle formed by the center of the decompressing aperture and the two tips of the center punches 16 and 17, or at the outside of this triangle if the pushing direction of the punches 16 and 17 is reversed.

The punches may also oscillate in a pivot-hole or one punch only may oscillate in a pivot-hole, the other in a V. In this case the blade spring 20 becomes useless.

The lever 15 may be actuated for instance by solenoid 24, the plunger 25 of which actuates a rod 26 connected with the lever 15.

The abutments 27 and 28 limit the opening and closing travel of the decompressing valve. The stop 28 especially limits the excessive squeezing of the slab, liable to be produced by the pressure of the coil spring 23 or by any action which may occur during an accidental absence of compressed air in the decompressing compartment C'.

Figure 3:
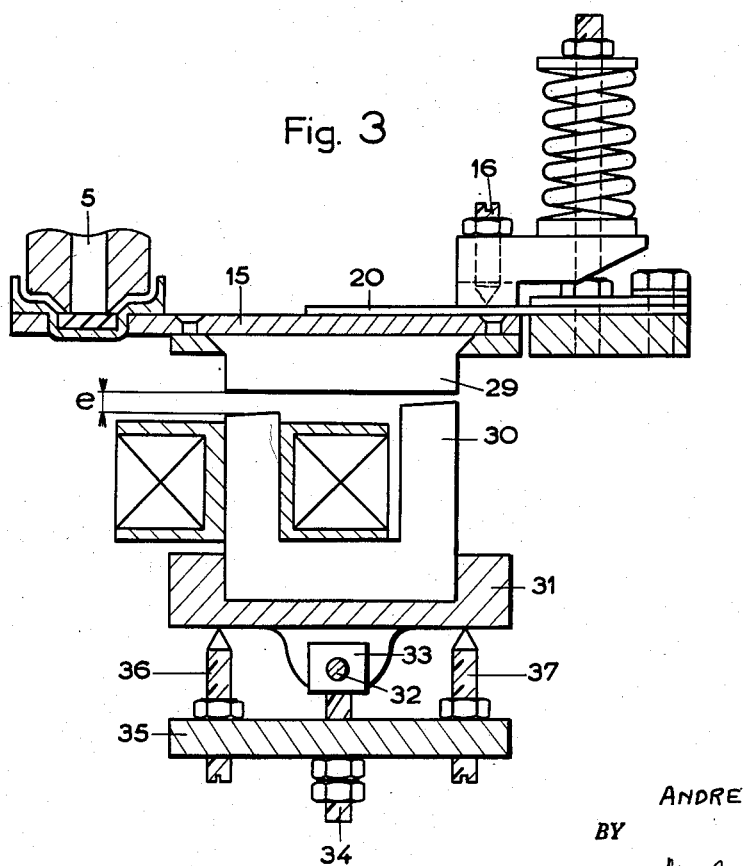
Fig. 3 is a part sectional view at a larger scale of a further embodiment of the invention.

The same result may be obtained for a given number of turns of the solenoid by reducing its air gap. Fig. 3 represents a device in which the previously described effects are increased and which comprises means to vary the gap of the solenoid. In this case the direction of the push produced by the center punches 16 and 17, defining the axis of rotation of the decompressing valve, is with reference to the nozzle 5 inversed as compared with Fig. 1. The closing spring acts now outside the triangle formed by the center of the decompressing aperture and the tips of the punches 16 and 17. The lever bearing the valve is integral with the armature 29 of the electromagnet 30. The surface of one pole approaches at its edge very closely this armature.

The electromagnet, whose armature and coil limit the movement of the lever to a predetermined distance is fixed in a plate 31 provided at its lower side with two brackets 33 bearing the axle 32, which passes through the head of the bolt 34 screwed in a fixed element 35. The plate 31 rests on three adjusting screws, two of which, 36 and 37, are disposed right and left of the bolt 34. For adjustment of the gap *e* the screws are conveniently regulated to give the desired distance between the plate 31 and the element 35, then the bolt 34 is clamped. The value of the gap *e* should be preferably smaller or almost equal to the travel of the decompressing valve.

If the current for the magnet-coil is to be switched on by push-button, subsequently replaced by a holding contact for the duration of the action of the control-valve, an auxiliary device may be provided. This device is connected to the duct 11 and consists in an auxiliary cylinder 38 prolonged by a frame 39. In the cylinder 38 moves the piston 40, the rod of which passes through the frame 39. The bottom aperture of this frame is provided with a washer of plastic material 41 forming a stop for the piston 40. On the piston rod is fixed a conducting slab 42 adapted to close the contact for current supply and, if so needed, a second contact. In the case of the pneumatic control of a circuit-breaker two control-valves are used, one for the make and one for the break. In this case the second contact may be closed in the first position of the slab, shown in Fig. 1. This contact may on breaking, secure the locking of that control-valve, which must be kept out of action as long as the other works. The corresponding case is described hereafter referring to Fig. 4.

The device according to the invention works as follows:

The Fig. 1 represents the device at rest, in other words, when no distribution takes place. At this moment the spring 9 presses the left end of the cylindrical body 7 against the washer 4, even when no compressed air is in the cylinder. Entering the cylinder through the duct 2, the compressed air fills the valve compartment C and by leakage the decompressing compartment C'. In this way the piston is subjected to two pressures acting in opposite directions, the one acting on the right face equal to the cross-section of the piston head, the other on the left face equal to the right one less the cross-section of the valve exposed by the duct 11 to atmospheric pressure. The difference of the two pressures acts as an additional force supplementing the pressure of the spring 9. When the electromagnet now lifts the lever 15 the decompressing compartment C' is brought to atmospheric pressure whereby the resultant of the forces acting on the piston is inversed and moves the piston to the right. The duct 11 is thus connected again to the compressed air while the expansion aperture is closed. At the same time, as it will be explained hereinafter, the piston 40 is moved upwards. The slab 42, which now leaves the contracts kept closed until now, closes then the circuit for auto-supply of the electromagnet.

When the decompressing valve 14 closes the aperture of the decompressing compartment C', the latter is filled with compressed air as described above, the piston is moved to the left, the valve 8 is closed, the valve 12 is opened bringing the duct 13 to atmospheric pressure, the piston 40 moves down with the slab 42, thus opening the contact for auto-supply and returning to its initial position.

Figure 4:
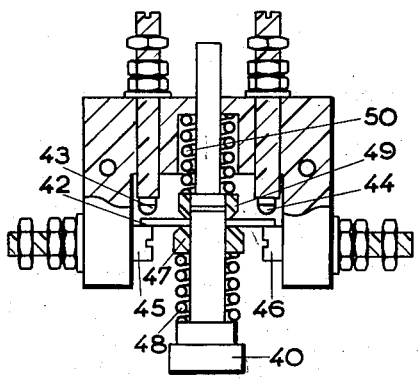
Fig. 4 is a part sectional view, at a larger scale, of a detail of Fig. 1.

Fig. 4 is a side view of the auxiliary device mentioned hereabove. 43 and 44 are the holding-contacts, 45 and 46 the locking contacts. The slab 42 is supported by the ring 47 sliding on the rod of the piston 40 and held in place by one end of the spring 48, while the other end is fixed to the rod. Also fixed to the rod is a ring 49 which supports the slab 42 till it closes the holding-contacts 43 and 44. The piston rod is subjected to the action of the return spring 50 which abuts against the upper end of the frame 39 (Fig. 1).

When the compressed air reaches the piston 40, the latter is subjected to a pressure tending to close abruptly the contacts for auto-supply. This movement, however, is cushioned by the springs 48 and 50.

The slab is fixed on the rod in a position so as to touch the contacts 43 and 44 before the piston has reached the washer 41 so that it may continue its stroke for a small amount, thus compressing the spring 48, and assuring a good contact for the auto-supply. The return of the piston is performed by the spring 50 alone, which at the same time provides for a good contact on the contacts 45 and 46.

What I claim is:

1. Valve operating apparatus comprising, in combination, a lever for closing and opening a valve; a pair of pins fixed to said lever and each having a free pointed end portion located on one side of said lever; a stationary support having a flat surface portion engaging said pointed end portions of said pins to form for said lever a turning axis located in the plane of said flat surface portion; and a leaf spring fixedly connected to said lever and said flat surface portion of said stationary support, extending in said plane of the latter across said turning axis, and including said turning axis for preventing movement of said lever by forces acting in said plane for limiting said lever to movement about said axis.

2. Valve operating apparatus comprising, in combination, a lever for closing and opening a valve; a pair of pins fixed to said lever and each having a free pointed end portion located on one side of said lever; a stationary strap having two branches between which a part of said lever is located and having a flat surface portion engaging said pointed end portions of said pins to form with the latter a turning axis for said lever; and a leaf spring fixedly connected to said flat surface portion of said strap, extending between said branches thereof, and being fixedly connected to said lever to maintain the latter in a predetermined position with respect to said strap.

3. Valve operating apparatus comprising, in combination, a lever for closing and opening a valve; a pair of pins fixed to said lever and each having a free pointed end portion located on one side of said lever; a stationary strap having two branches between which a part of said lever is located and having a flat surface portion engaging said pointed end portions of said pins to form with the latter a turning axis for said lever; a leaf spring fixedly connected to said flat surface portion of said strap, extending between said branches thereof, and being fixedly connected to said lever to maintain the latter in a predetermined position with respect to said strap; spring means operatively connected to said lever for urging the latter toward its valve closing position; and electromagnetic means operatively connected to said lever for urging the latter against the action of said spring means to a valve opening position.

4. Valve operating apparatus comprising, in combination, a lever for closing and opening a valve; a pair of pins fixed to said lever and each having a free pointed end portion located on one side of said lever; a stationary strap having two branches between which a part of said lever is located and having a flat surface portion engaging said pointed end portions of said pins to form with the latter a turning axis for said lever; a leaf spring fixedly connected to said flat surface portion of said strap, extending between said branches thereof, and being fixedly connected to said lever to maintain the latter in a predetermined position with respect to said strap; spring means operatively connected to said lever for urging the latter toward its valve closing position; and electromagnetic means operatively connected to said lever for urging the latter against the action of said spring means to a valve opening position, said electromagnetic means comprising an armature fixed to said lever and a core located at a predetermined distance from said armature, when said electromagnetic means is unenergized, to limit the movement of said lever to said predetermined distance.

5. Valve operating apparatus comprising, in combination, a lever for closing and opening a valve; a pair of pins fixed to said lever and each having a free pointed end portion located on one side of said lever; a stationary strap having two branches between which a part of said lever is located and having a flat surface portion engaging said pointed end portions of said pins to form with the latter a turning axis for said lever; a leaf spring fixedly connected to said flat surface portion of said strap, extending between said branches thereof, and being fixedly connected to said lever to maintain the latter in a predetermined position with respect to said strap; spring means operatively connected to said lever for urging the latter toward its valve closing position; electromagnetic means operatively connected to said lever for urging the latter against the action of said spring means to a valve opening position, said electromagnetic means comprising an armature fixed to said lever and a core located at a predetermined distance from said armature, when said electromagnetic means is unenergized, to limit the movement of said lever to said predetermined distance; and adjusting means operatively connected to said core of said electromagnetic means for adjusting the distance between said core and armature so as to adjust the stroke of said lever.

ANDRÉ LATOUR.

References Cited in the file of this patent

UNITED STATES PATENTS

| Number | Name | Date |
|---|---|---|
| 410,181 | Ongley | Sept. 3, 1889 |
| 883,383 | Borden | Mar. 31, 1908 |
| 921,371 | Dibble | May 11, 1909 |
| 948,404 | Webb | Feb. 8, 1910 |
| 1,072,507 | Ross | Sept. 9, 1913 |
| 1,344,128 | Griffiths | June 22, 1920 |
| 1,422,902 | Thomas | July 18, 1922 |
| 1,513,142 | Webb | Oct. 28, 1924 |
| 1,619,351 | Lindsay | Mar. 1, 1927 |
| 1,622,539 | Penney | Mar. 29, 1927 |
| 1,964,281 | Young | June 26, 1934 |
| 1,973,769 | Lehn | Sept. 18, 1934 |
| 2,261,827 | Brown | Nov. 4, 1941 |
| 2,363,111 | Bennett | Nov. 21, 1944 |
| 2,494,781 | Stover | Jan. 17, 1950 |

FOREIGN PATENTS

| Number | Country | Date |
|---|---|---|
| 4,564 | Great Britain | 1900 |
| 584,178 | France | Nov. 14, 1924 |